United States Patent
Tofsland et al.

(10) Patent No.: US 12,018,601 B2
(45) Date of Patent: Jun. 25, 2024

(54) METHODS OF ATTACHING A FLAT LAYER TO A HUB OF AN AXIAL FLOW ELEMENT

(71) Applicant: Cummins Filtration IP, Inc., Columbus, IN (US)

(72) Inventors: Kenneth M. Tofsland, Stoughton, WI (US); Christopher E. Holm, Madison, WI (US); Chirag D. Parikh, Madison, WI (US); Rajath Martin, Madison, WI (US)

(73) Assignee: Cummins Filtration IP, Inc., Columbus, IN (US)

( * ) Notice: Subject to any disclaimer, the term of this patent is extended or adjusted under 35 U.S.C. 154(b) by 65 days.

(21) Appl. No.: 17/611,717

(22) PCT Filed: May 15, 2020

(86) PCT No.: PCT/US2020/033049
§ 371 (c)(1),
(2) Date: Nov. 16, 2021

(87) PCT Pub. No.: WO2020/236548
PCT Pub. Date: Nov. 26, 2020

(65) Prior Publication Data
US 2022/0235682 A1 Jul. 28, 2022

Related U.S. Application Data

(60) Provisional application No. 62/850,774, filed on May 21, 2019.

(51) Int. Cl.
*B01D 45/14* (2006.01)
*F01M 13/04* (2006.01)

(52) U.S. Cl.
CPC ............. *F01M 13/04* (2013.01); *B01D 45/14* (2013.01); *F01M 2013/0422* (2013.01)

(58) Field of Classification Search
CPC .......... F01M 13/04; F01M 2013/0422; B01D 45/14; B65H 19/2269; B65H 20/06; B65H 19/267; B65H 75/28
See application file for complete search history.

(56) References Cited

U.S. PATENT DOCUMENTS 3,625,451 A * 12/1971 Anderson ............... B65H 75/28
242/125.1
3,840,196 A * 10/1974 Presentey ............ G11B 15/674
242/586.5

(Continued)

FOREIGN PATENT DOCUMENTS

CN 105366452 A 3/2016
CN 107777480 A 3/2018

(Continued)

OTHER PUBLICATIONS

International Search Report and Written Opinion issued for PCT Application No. PCT/US2020/033049 issued Sep. 3, 2020, 19 pages.

(Continued)

*Primary Examiner* — Dung H Bui
(74) *Attorney, Agent, or Firm* — Foley & Lardner LLP

(57) ABSTRACT

An axial flow element for use in a liquid separation system for an internal combustion engine includes a hub, a groove, a locking member, and a flat layer. The hub includes a cylindrical outer surface. The groove is disposed in the outer surface. The groove extends in a substantially longitudinal direction along the hub from a first end of the hub to a second end of the hub. The locking member is disposed in the groove. The flat layer is disposed between the hub and the locking member.

15 Claims, 18 Drawing Sheets

(56) References Cited

U.S. PATENT DOCUMENTS

| | | | | |
|---|---|---|---|---|
| 4,238,083 | A | * | 12/1980 | Scandella ............ G01B 3/1041 |
| | | | | 242/587.2 |
| 4,456,192 | A | | 6/1984 | Sato et al. |
| 4,742,969 | A | | 5/1988 | Masuda et al. |
| 5,080,787 | A | | 1/1992 | Brown et al. |
| 5,803,396 | A | * | 9/1998 | Dewaele ............... B65H 55/00 |
| | | | | 242/532.6 |
| 6,068,210 | A | * | 5/2000 | Risa ...................... B65H 75/28 |
| | | | | 242/395 |
| 6,237,492 | B1 | * | 5/2001 | Konig ................... B41F 35/00 |
| | | | | 101/423 |
| 2011/0240791 | A1 | * | 10/2011 | Lindley ................ B65H 75/14 |
| | | | | 242/609 |
| 2017/0253450 | A1 | * | 9/2017 | Mellin ............... B65H 19/2269 |
| 2018/0062144 | A1 | * | 3/2018 | Hashiwaki ............ B65H 75/28 |
| 2019/0233250 | A1 | * | 8/2019 | Qian ..................... B65H 75/28 |

FOREIGN PATENT DOCUMENTS

| | | |
|---|---|---|
| CN | 208684160 | 4/2019 |
| CN | 208790813 U | 4/2019 |
| DE | 20 2005 009 994 U1 | 11/2006 |
| EP | 0 443 334 A1 | 8/1991 |
| EP | 1 826 167 A1 | 8/2007 |
| GB | 1 415 654 | 11/1975 |
| JP | 488861 U | 8/1992 |
| JP | H08-259117 A | 10/1996 |
| WO | WO-2018/236921 | 12/2018 |

OTHER PUBLICATIONS

Office Action issued for Chinese Paten Application No. 202080037170.0 issued Feb. 17, 2023, 16 pages.

Extended Search Report for European Patent Application No. EP20809317.9, issued May 12, 2023, 9 pages.

* cited by examiner

METHODS OF ATTACHING A FLAT LAYER TO A HUB OF AN AXIAL FLOW ELEMENT

CROSS REFERENCE TO RELATED APPLICATIONS

The present application is a National Phase of PCT Application No. PCT/US2020/033049 filed May 15, 2020, which claims the benefit of priority to U.S. Provisional Application No. 62/850,774, "Entitled Methods of Attaching a Flat Layer to a Hub of an Axial Flow Element" and filed May 21, 2019. The contents of these applications are incorporated herein by reference in their entirety and for all purposes.

TECHNICAL FIELD

The present application relates generally to automated manufacturing techniques.

BACKGROUND

In various applications, it is generally desirable to minimize human interaction during a manufacturing process. Among other benefits, minimizing human interaction can reduce manufacturing costs and increase product throughput. However, many tasks that are simple for a human to perform are difficult to automate. For example, winding operations are particularly challenging to automate using existing manufacturing techniques. In a winding operation, a material is wrapped multiple times around a central mandrel (e.g., a bobbin, spool, reel, etc.). At the beginning of a winding operation, a leading edge of the material must be pressed against or otherwise secured to an outer surface of the mandrel in order to initiate the winding process. This operation can be time consuming when implemented manually by an operator of the winding system. Moreover, adhesives and other bonding agents that may be used to secure the material to the central mandrel are messy and may need time to cure before reaching full bond strength.

SUMMARY

In one set of embodiments, an axial flow element includes a hub, a groove, a locking member, and a flat layer. The hub includes a cylindrical outer surface. The groove is disposed in the outer surface. The groove extends in a substantially longitudinal direction along the hub from a first end of the hub to a second end of the hub. The locking member is disposed in the groove. The flat layer is disposed between the hub and the locking member.

In another set of embodiments, a hub includes a body, a groove, and a plurality of crush ribs. The body includes a cylindrical outer surface. The groove is disposed in the outer surface. The groove extends in a substantially longitudinal direction along the body In another set of embodiments, a method of making an axial flow element includes providing a hub. The hub includes a groove disposed on an outer surface of the hub. The groove extends in a substantially longitudinal direction along the hub. The method also includes providing a flat layer and providing a locking member. The method further includes positioning the flat layer above the groove, positioning the locking member above the groove and the flat layer, and pressing the locking member into the groove.

BRIEF DESCRIPTION OF THE FIGURES

The details of one or more implementations are set forth in the accompanying drawings and the description below. Other features, aspects, and advantages of the disclosure will become apparent from the description, the drawings, and the claims, in which:

Figure 1:
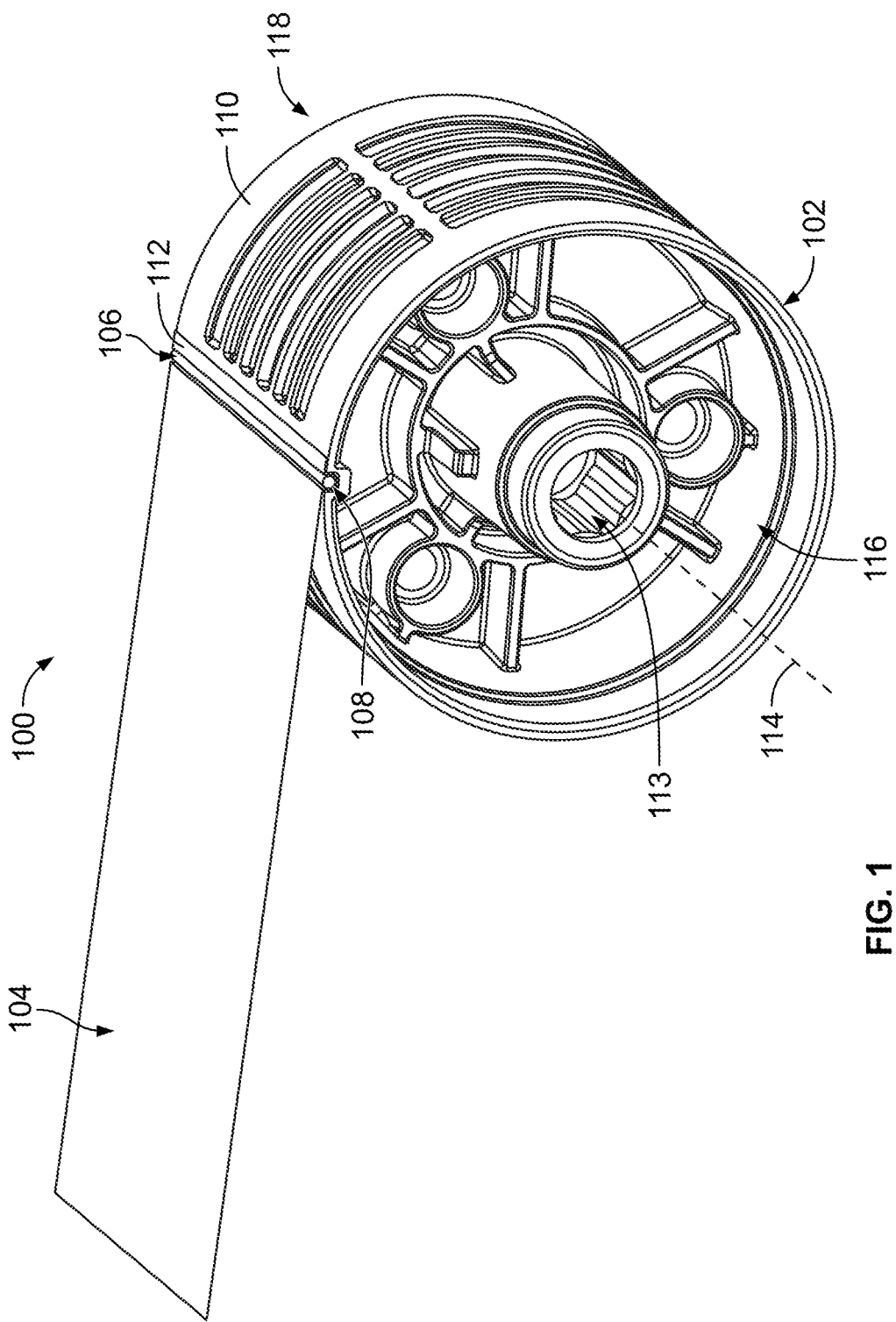
FIG. 1 is a perspective view of a first example axial flow element.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for making an axial flow element for a liquid separation system. The various concepts introduced above and discussed in greater detail below may be implemented in any of numerous ways, as the described concepts are not limited to any particular manner of implementation. Examples of specific implementations and applications are provided primarily for illustrative purposes.

I. Overview

In a winding operation, a material is wrapped in tension around a central mandrel to form a roll. The material may be a flat layer, sheet, or film that is applied to the central mandrel. Winding operations may be automated using a winding system that rotates the central mandrel while (at the same time) supporting the flat layer to maintain the material in tension during winding. At the beginning of the winding operation, the flat layer must be attached to the central mandrel. This starts the winding process and allows for the transmission of torque to the roll in order to achieve the proper tension in the flat layer. In certain applications, the amount of tension applied to the roll can be very important. For example, in winding systems used to manufacture axial flow elements for liquid separation systems, the amount of tension applied to the roll during the winding operation is an important factor in achieving the desired structural and dimensional requirements. To address these issues, winding systems may utilize adhesives or other bonding agents to form a connection between a leading ledge of the flat layer and the central mandrel. Alternatively, a leader strip may be used, which is pre-applied to the central mandrel before the winding operation. The leader strip may be easier to access by press tooling or other components of the winding system at the beginning of the winding operation. However, using a leader strip adds another step to the manufacturing process that must be manually performed.

Implementations herein relate to methods and systems for reliably securing the flat layer to the central mandrel at the beginning of a winding operation. Specifically, the methods disclosed herein facilitate automated winding of an axial flow element for a liquid separation system. The axial flow element includes a central mandrel or hub having a generally cylindrical outer surface and a flat layer disposed thereon. In one aspect, a pin-in-groove method is provided in order to connect the flat layer to the hub at the start of the winding operation. The method includes positioning the flat layer above a groove in the hub, positioning a locking member above the groove and the flat layer, and pressing the locking member against the flat layer and into the groove. The groove may be disposed in an outer surface of the hub. The groove may extend in a substantially longitudinal direction between a first end of the hub and a second end of the hub in order to secure the flat layer in tension along an entire width of the flat layer (e.g., a width of the flat layer in a direction parallel to a central axis of the hub). Among other benefits, the pin-in-groove method may be easily implemented in an automated manufacturing system; for example, by using a press tool to press the locking member into the hub, without any interaction from an operator or another user.

I. Example Axial Flow Element

FIG. 1 is a perspective view of a first example axial flow element, shown as element 100. The element 100 is used in a liquid separation system for an internal combustion engine. The liquid separation system may be a crankcase ventilation system for a diesel engine that uses diesel fuel to drive the combustion process or another internal combustion engine system using a different type of fuel source. The crankcase ventilation system is used to separate combustion products (e.g., oil, soot, etc.) from blow-by gases that are introduced into the engine housing (e.g., crankcase). In the example embodiment of FIG. 1, the element 100 forms part of a rotating crankcase ventilation system which rotates the element 100 to improve liquid separation performance. The rotating crankcase ventilation system may be a hydraulically-driven rotating crankcase ventilation system (HRCV) (that utilizes hydraulic fluid or oil to rotate the element 100) or an electrically-driven rotating crankcase ventilation system (ERCV) (that utilizes an electrical motor to rotate the element 100).

As shown in FIG. 1, the element 100 includes a hub 102 (e.g., body, etc.), a flat layer 104, and a locking member 106. The locking member 106 is disposed within a groove 108 on an outer surface 110 of the hub 102 and secures the flat layer 104 in position relative to hub 102. The flat layer 104 is "sandwiched" or otherwise disposed between the locking member 106 and the groove 108. A leading edge 112 of the flat layer 104 is coupled to the hub 102 at a single circumferential position along the hub 102. In other example embodiments, the flat layer 104 may be coupled to the hub 102 at a plurality of different positions along the outer surface 110.

Figure 2:
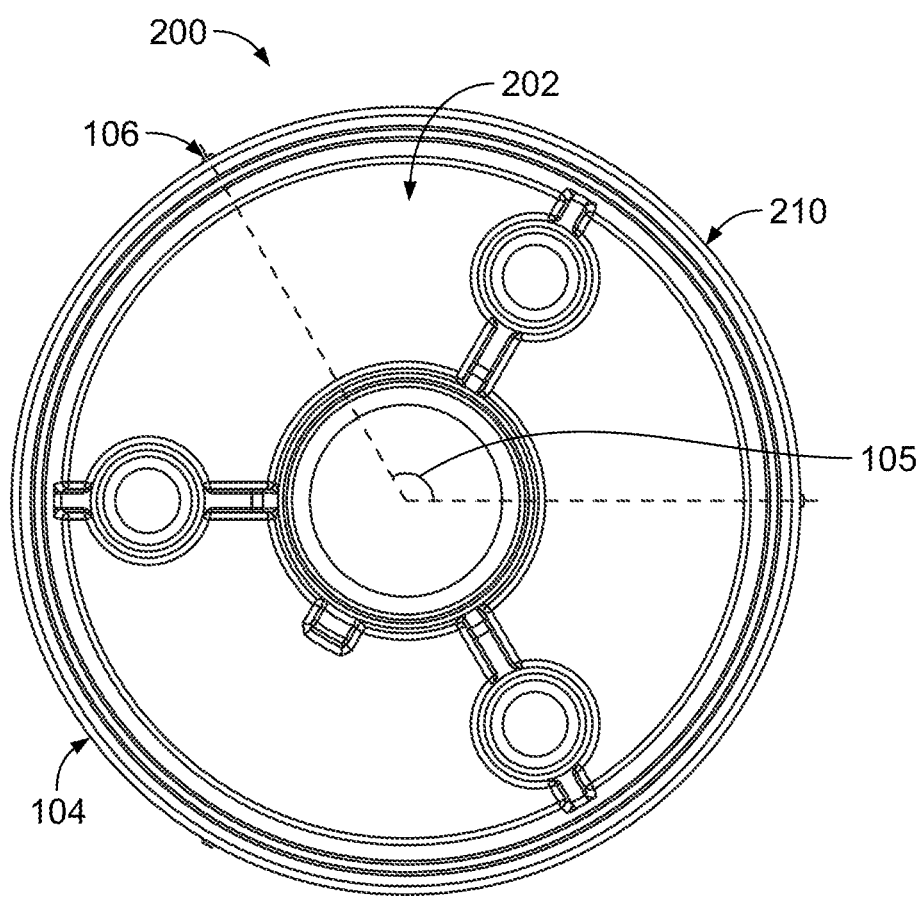
FIG. 2 is a top view of a second example axial flow element.

FIG. 2 is a perspective view of a second example axial flow element, shown as element 200. Several components of the element 200 of FIG. 2 are similar to the components of the element 100 of FIG. 1. To that extent, similar components have been labeled with similar reference numbers. As shown in FIG. 2, the element 200 includes a hub 202 and three grooves 108 (not shown) disposed on an outer surface 210 of the hub 202. The element 200 also includes three locking members 106, each locking member 106 disposed in a respective one of the grooves 108. The grooves 108 (and the locking members 106) are spaced approximately equally along an outer perimeter of the hub 202 (e.g., circumferentially along the outer surface 210, at equal angular intervals along the outer surface 210, etc.). In the example embodiment of FIG. 2, an angle 105 between each of the locking members 106 is approximately 120°. Among other benefits, using a plurality of locking members 106 to attach the flat layer 104 to the hub 102 increases the torque that may be applied to the hub 202 (and the tension applied to the flat layer 104) during a winding process. Moreover, because the locking members 106 are equally spaced along the outer perimeter of the hub 202, the hub 202 remains rotationally balanced.

Figure 3:
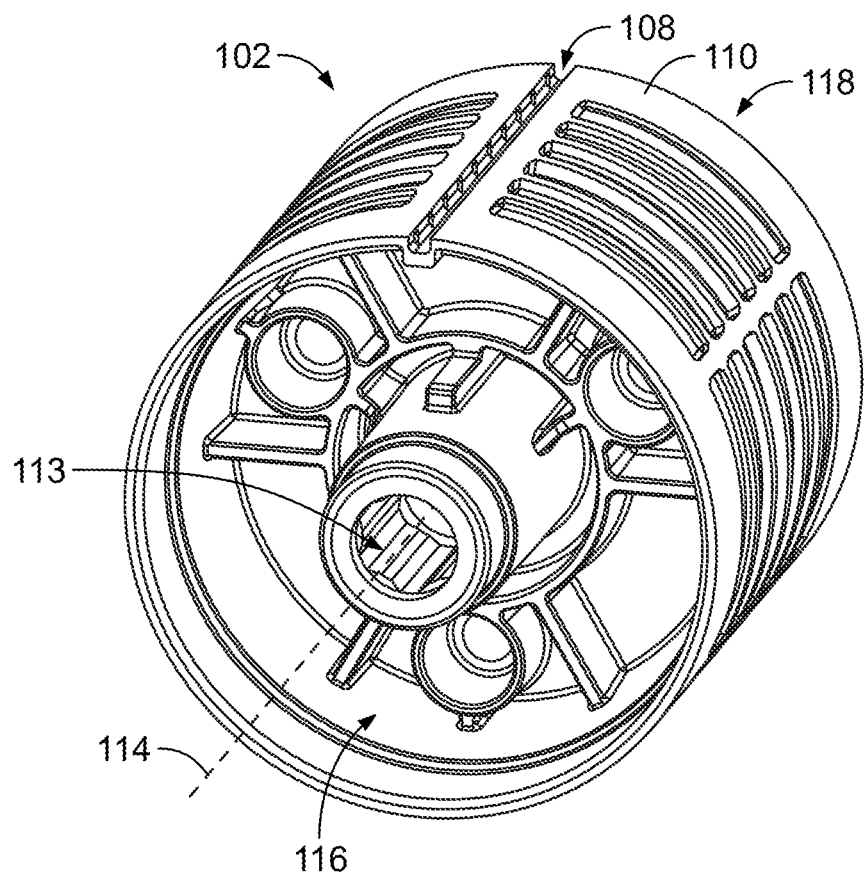
FIG. 3 is a perspective view of a hub of the axial flow element of FIG. 1.

FIG. 3 is a perspective view of the hub 102 of FIG. 1 in isolation from the flat layer 104 and the locking member 106. As shown, the element 100 includes an opening 113 disposed centrally on the hub 102 and extending in a longitudinal direction, parallel to a central axis 114 of the hub 102. The opening 113 is structured to receive a rod, post, or other support member therein in order to couple the hub 102 to a winding system. In this way, the winding system may exert a torque on the hub 102 during the winding operation.

As shown in FIG. 3, the groove 108 extends in a substantially longitudinal direction along the hub 102, parallel to the central axis 114 of the hub 102, from a first end 116 of the hub 102 to a second end 118 of the hub 102. The groove 108 is integrally formed into the outer surface 110 of the hub 102 as a single unitary structure. In some example embodiments, the hub 102 is formed from a plastic material such as polypropylene, nylon, glass reinforced nylon, or another suitable plastic via an injection molding process. In other example embodiments, the groove 108 may be machined or otherwise formed into the outer surface of the hub 102.

Figure 4:
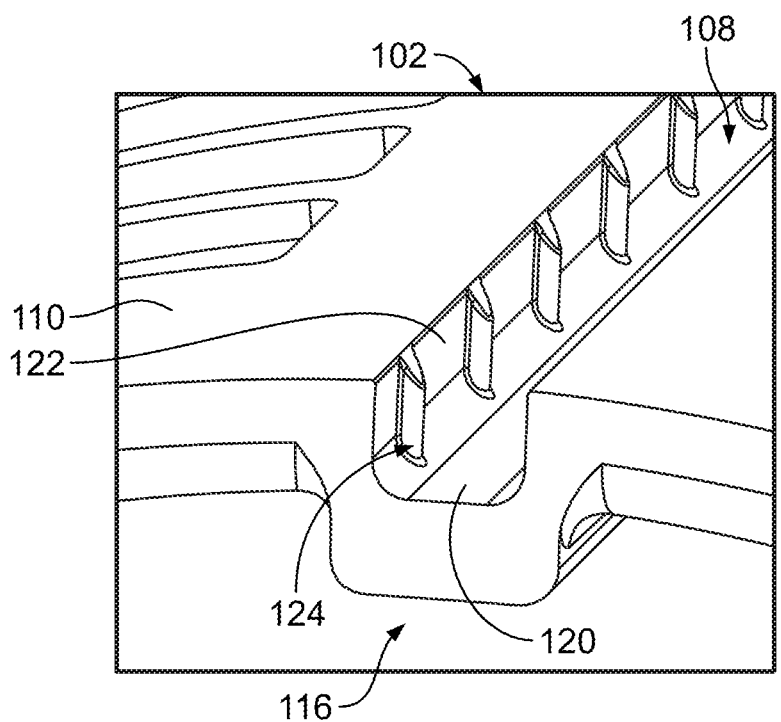
FIG. 4 is a perspective view of a groove of the hub of FIG. 3.

FIG. 4 is a perspective view of the groove 108 near the first end 116 of the hub 102. The groove 108 is sized and shaped to receive the locking member 106 (see also FIG. 1) therein. In the example embodiment of FIG. 4, the groove 108 is a recessed area within the outer surface 110. The groove 108 includes a lower wall 120 and two side walls 122 in substantially perpendicular orientation relative to the lower wall 120. Together, the lower wall 120 and the side walls 122 define a generally C-shaped channel. The hub 102 additionally includes a plurality of crush ribs 124 disposed within the groove 108 and extending along a length of the groove 108 in the longitudinal direction (e.g., parallel to the central axis 114 of the hub 102). The crush ribs 124 extend outwardly from the side wall 122 in a substantially perpendicular orientation relative to the side wall 122. In the example embodiment of FIG. 4, the crush ribs 124 are integrally formed with the hub 102 (e.g., into the side wall 122) as a single unitary structure. The crush ribs 124 are spaced at approximately equal intervals along the length of the groove 108 in the longitudinal direction. In other example embodiments, the spacing between the crush ribs 124 may be different and/or non-uniform along the length of the groove 108.

Figure 5:
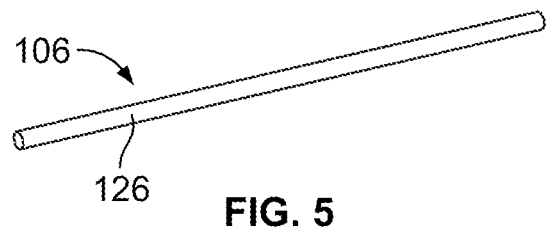
FIG. 5 is a perspective view of an example locking member.

FIG. 5 is a perspective view of the locking member 106. In the example embodiment of FIG. 5, the locking member 106 comprises a pin 126 and/or wire having a generally circular cross-section normal to a central axis through the pin 126. The pin 126 may include a magnetic material (e.g., iron) structured to engage with a permanent magnet or an electromagnet in a press tool (e.g., a press tool in a winding system for the element 100). In some example embodiments, the pin 126 is an inexpensive copper coated weld wire or steel wire pin. In other embodiments, the locking member 106 may be shaped differently. As shown in FIG. 1, the locking member 106 is sized and shaped to nestably mate with the groove 108 in the hub 102. A length of the locking member 106 in the longitudinal direction is approximately the same as the length of the groove 108 in the hub 102 such that the tension applied to the flat layer 104 is distributed evenly along the length of the flat layer 104 (e.g., a length of the flat layer 104 that is oriented perpendicular to a winding direction for the hub 102).

Figure 6:
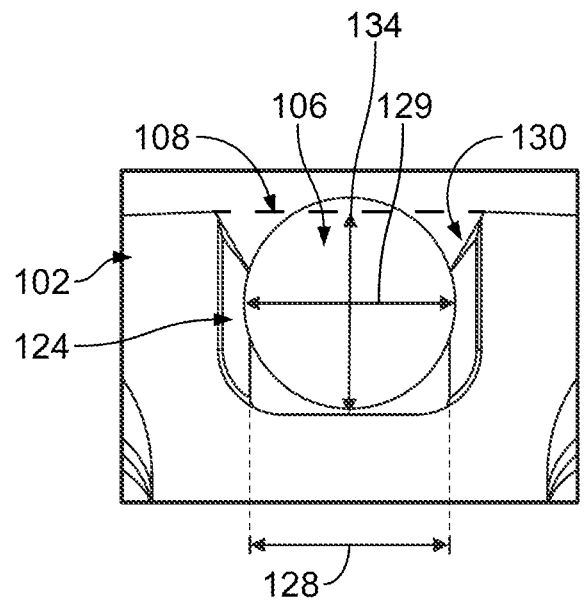
FIG. 6 is a top view of a locking member disposed in the groove of FIG. 4.

The crush ribs 124 are structured to engage with the locking member 106 (e.g., indirectly via the flat layer 104) and to secure the locking member 106 in position with respect to the hub 102 (e.g., within the groove 108) during a winding process. FIG. 6 is a top view of the element 100 isolated from the flat layer 104 (see also FIG. 1). As shown, the crush ribs 124 are arranged in diametrically opposed pairs along the length of the groove 108. In other embodiments, the crush ribs 124 may be staggered such that the crush ribs 124 on either side of the groove 108 are located at different longitudinal positions along the length of the groove 108.

The crush ribs 124 are structured to deform in response to an applied force from the locking member 106. A width 128 of the groove 108 between the diametrically opposed pair of crush ribs 124 (e.g., between an innermost edge of the crush ribs 124) is less than a diameter 129 of the locking member 106. In the example embodiment of FIG. 6, each one of the crush ribs 124 includes a beveled portion 130 (e.g., a taper, etc.) proximate to an outer edge 132 of the groove 108.

Among other benefits, the beveled portion 130 provides a lead-in for the locking member 106 and facilitates positioning of the locking member 106 within the groove 108 by a winding system. As shown in FIG. 6, a depth 134 of the groove 108, in a substantially radial direction (e.g., relative to the central axis 114 of the groove 108 as shown in FIG. 3), from the lower wall 120 to the outer surface 110, is approximately the same as the diameter 129 of the locking member 106. In this way, the locking member 106 remains substantially flush with the outer surface 110, which reduces the risk of bumps or protrusions where the flat layer 104 overlaps the locking member 106.

Figure 7:
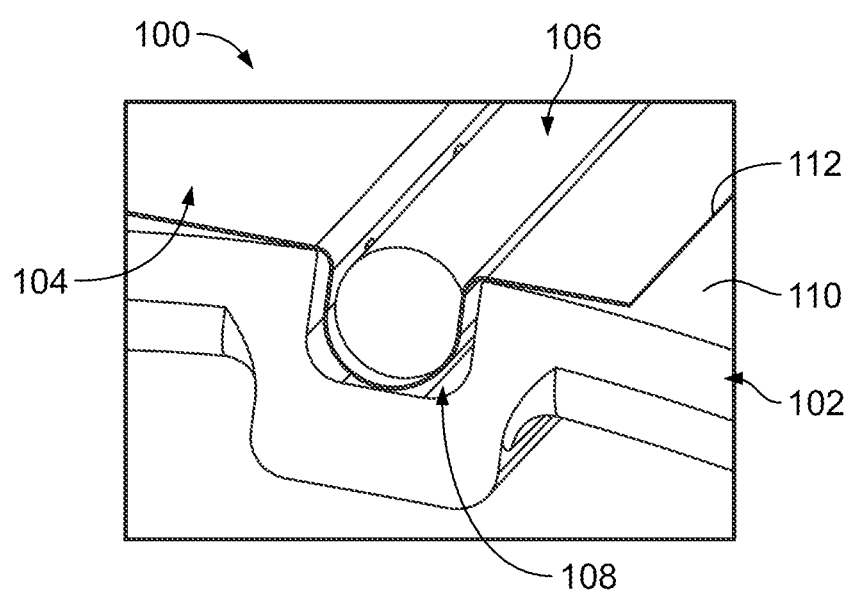
FIG. 7 is a perspective view of the axial flow element of FIG. 1 near a groove.

FIG. 7 is a perspective view of the element 100 of FIG. 1 in an area near the groove 108. As shown, the flat layer 104 is "sandwiched" or otherwise disposed between the hub 102 (e.g., the groove 108) and the locking member 106. The leading edge 112 of the flat layer 104 is secured in position relative to the groove 108 by a frictional force resulting from the contact force between the locking member 106 and the crush ribs 124. In other words, the groove 108 is sized to receive the locking member 106 in an interference fit arrangement (e.g., press fit, force fit, etc.). In some example embodiments, the flat layer 104 may include or be made from a thin metal foil (e.g., aluminum, etc.). In alternative embodiments, the flat layer 104 may be directly coupled to the locking member 106; for example, via a welding operation, to secure the flat layer 104 in position relative to the hub 102.

Figure 8:
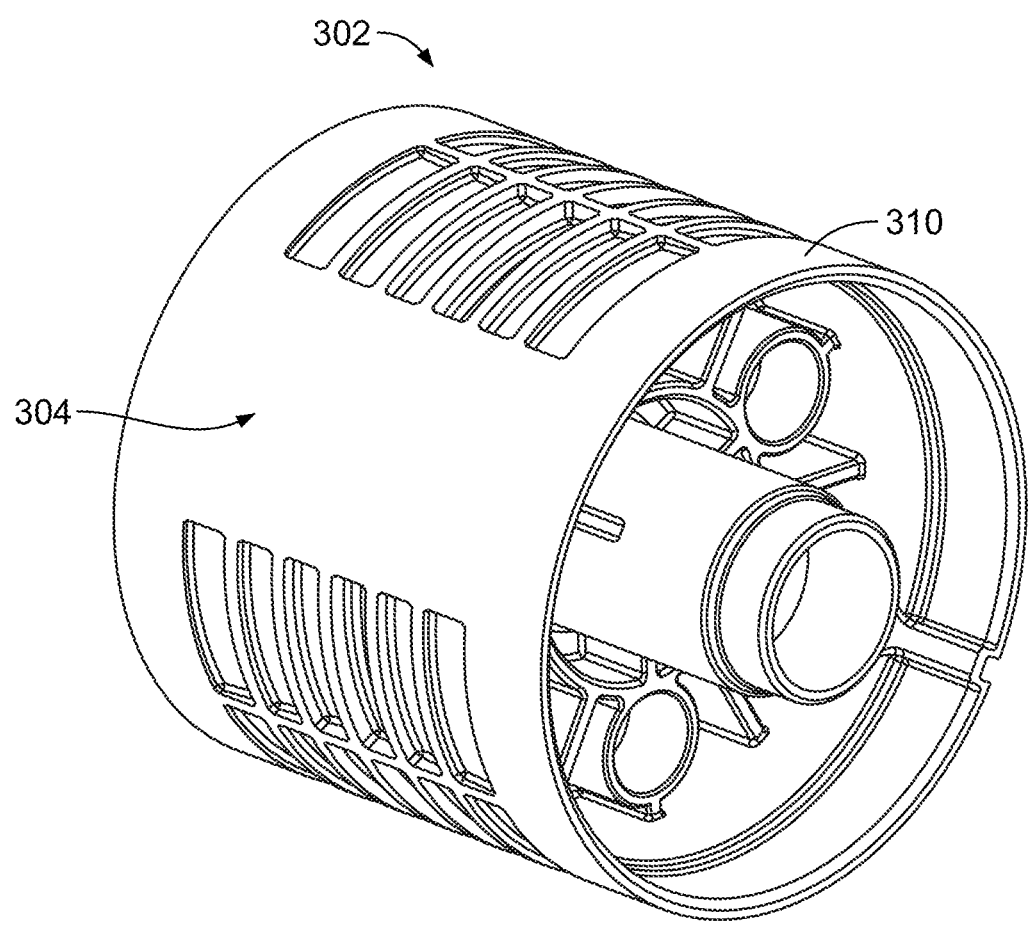
FIG. 8 is a perspective view of an example hub for an axial flow element.

FIG. 8 is a perspective view of another example hub 302 for an axial flow element. The hub 302 includes a groove 108 and a balancing member 304 disposed on an opposite side the hub 302 as the groove 108 (e.g., an opposite side of an outer surface 310 of the hub 302). The balancing member 304 may be sized and shaped to counter balance (e.g., rotationally) the locking member (not shown). In the example embodiment of FIG. 8, the balancing member 304 is a solid piece of material that extends along the length of the hub 302. In other embodiments, the balancing member may include a filler material embedded within the outer surface 310 of the hub 302 or another suitable balancing feature.

I. Example Manufacturing Method for the Example Axial Flow Element

Figure 9:
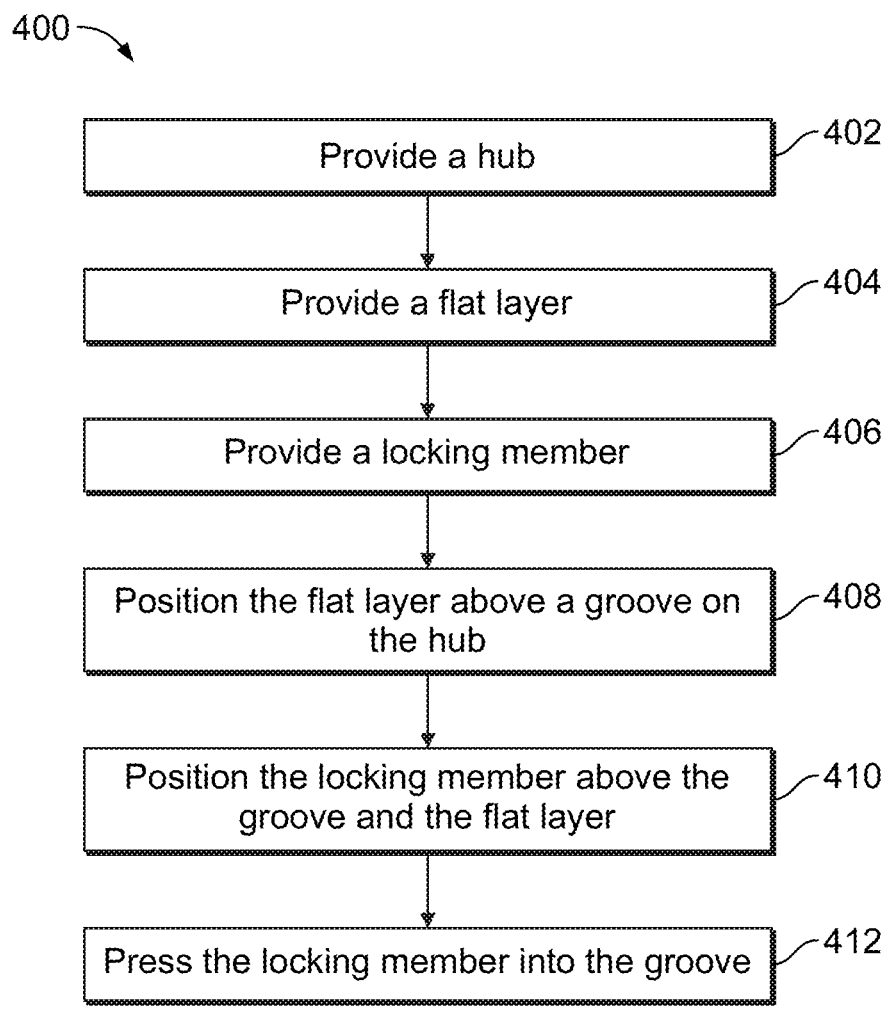
FIG. 9 is a flow diagram of a method of making an axial flow element.

FIG. 9 is a flow diagram of a method 400 of making an axial flow element. The axial flow element may be the same or similar to the axial flow element 100 of FIG. 1 (or, alternatively, the axial flow element 200 of FIG. 2). At 402, a hub 102 is provided. Block 402 may include forming the hub 102 from a plastic material using an injection molding process. Alternatively, or in combination, block 402 may include forming a groove 108 into an outer surface 110 of the hub 102. At 404 and 406, both a flat layer 104 and a locking member 106 are provided. At 408, the flat layer 104 is positioned above the groove 108 on the hub 102. Block 408 may include inserting the hub 102 onto a mandrel, post, spool, bobbin, reel, or another suitable support for a winding system (e.g., via opening 113 as shown in FIG. 1). Block 408 may additionally include advancing (e.g., feeding) the flat layer 104 (e.g., the leading edge 112 as shown in FIG. 7) toward the hub 102; for example, by using a feeding system and a series of guides. Block 408 may further include aligning the flat layer 104 with a portion of the groove 108 and/or the outer surface 110 of the hub 102, for example by advancing the flat layer 104 until the leading edge 112 of the flat layer 104 extends to just beyond a trailing edge of the groove 108.

At 410, the locking member 106 is positioned above the groove 108 and the flat layer 104. Block 410 may include providing a press tool including a magnetic holder and engaging the magnetic holder with the locking member 106. The magnetic holder may include a permanent magnet (e.g., a rare earth magnet) structured to magnetically couple the magnetic holder to the locking member 106. Alternatively, the magnetic holder may include an electromagnet. Block 410 may include activating the electromagnet to magnetically couple the magnetic holder to the locking member 106. A length of the magnetic holder may be approximately the same as the length of the locking member 106 in order to more accurately position the locking member 106 above the groove and to provide an equal force along the length of the locking member 106 during the assembly process. Block 410 may additionally include aligning the magnetic holder with the groove 108 (e.g., with a central axis passing through the groove 108). This may include determining an angular position of the groove 108 relative to the magnetic holder. The angular position of the groove 108 may be determined by using a sensor such as an optical sensor directed toward the hub 102.

At 412, the locking member 106 is pressed into the groove 108. Block 412 may include extending the magnetic holder of the press tool toward the groove 108 and applying a radial force to the magnetic holder (and locking member 106) to press the locking member 106 into the groove 108. The method 400 may additionally include retracting the magnetic holder away from the locking member 106. In other example embodiments, the method may include additional, fewer, and/or different operations.

I. Additional Example Axial Flow Elements

Figure 10:
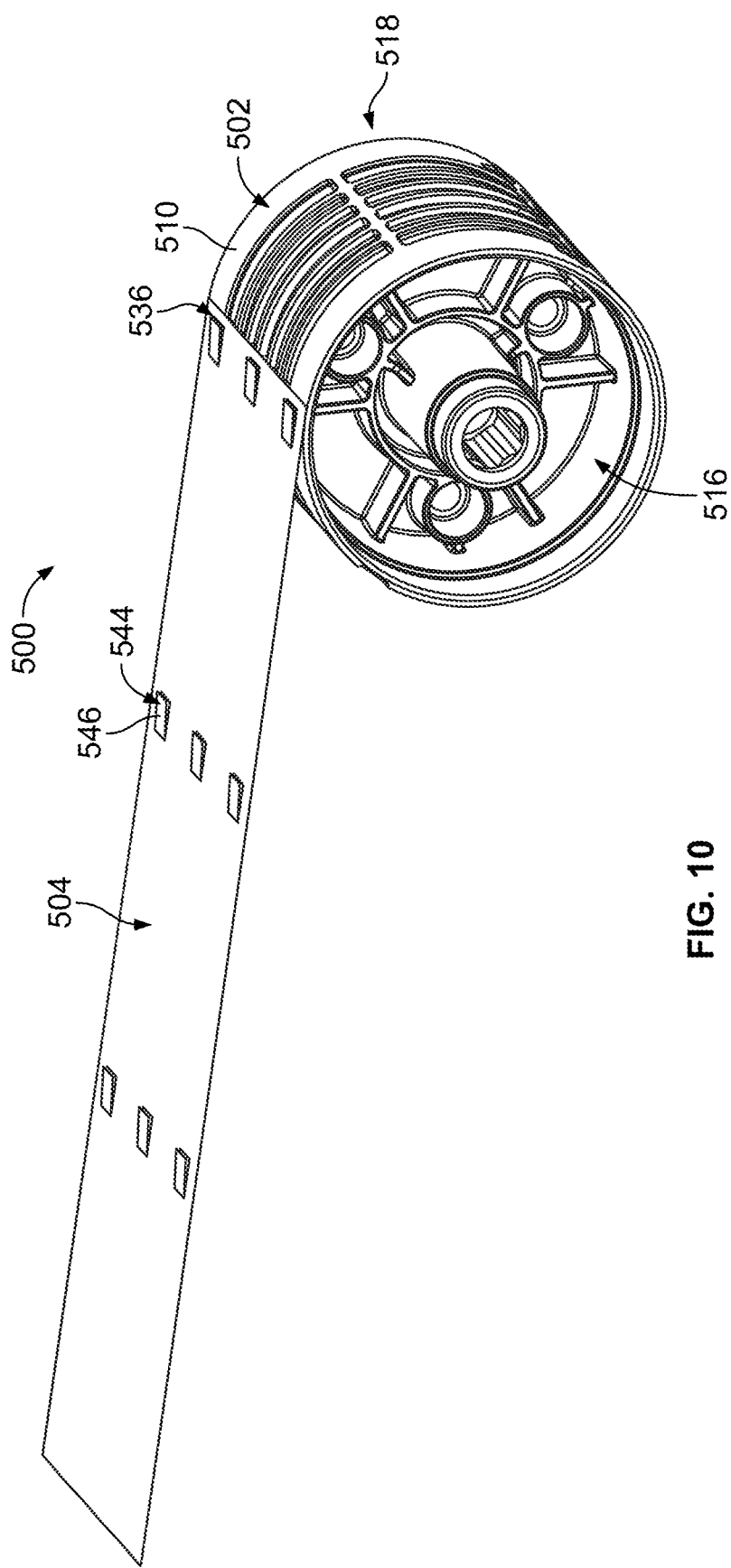
FIG. 10 is a perspective view of a third example axial flow element.
Figure 11:
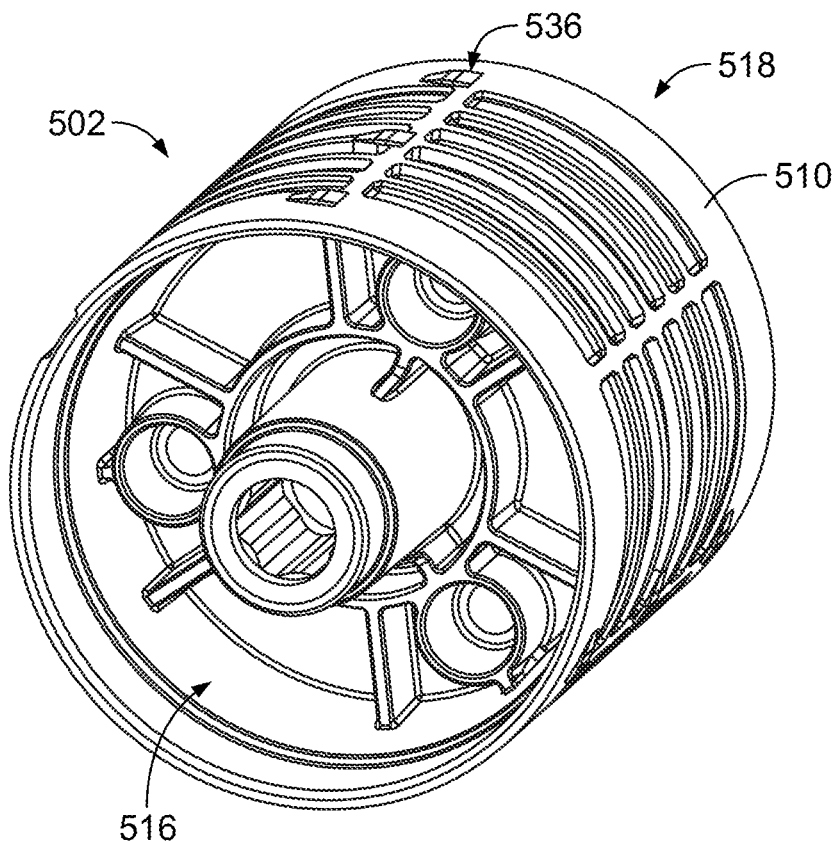
FIG. 11 is a perspective view of a hub for the axial flow element of FIG. 10.
Figure 12:
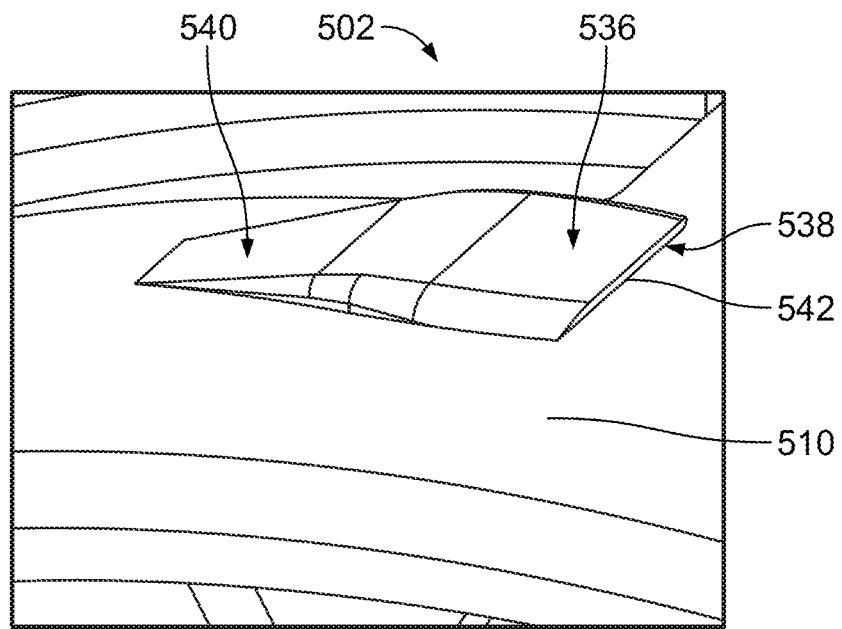
FIG. 12 is a perspective view of the hub of FIG. 11 near a catch member on the hub.

FIG. 10 depicts a third example axial flow element, shown as element 500. The element 500 includes a hub 502 and a flat layer 504 coupled thereto. The hub 502 includes a plurality of catches 536 (e.g., catch lugs, etc.) structured to secure a flat layer 504 in position along an outer surface 510 of the hub 502. FIG. 11 is a perspective view of the hub 502 isolated from the flat layer 504 (see also FIG. 12). As shown, the catches 536 extend along the length of the hub 502 in a longitudinal direction. The catches 536 are spaced at approximately equal intervals along an outer surface 510 of the hub 502 between a first end 516 of the hub 502 and a second end 518 of the hub 502. FIG. 12 is a perspective view of the hub 502 near one of the catches 536. The catches 536 extend substantially radially outward from the outer surface 510 of the hub 502. Each one of the catches 536 includes a step portion 538 and a transition portion 540. An inner surface 542 of the step portion 538 forms an acute angle with the outer surface 510. In other embodiments, the inner surface 542 of the step portion 538 may be substantially perpendicular to the outer surface 510. Among other benefits, engaging the flat layer 504 with the angled surface reduces the risk of the flat layer 504 detaching from the catch 536. As shown in FIG. 12, the transition portion 540 is disposed on an opposite end of the catch 536 as the step portion 538 and sets a roll direction for the element 500 (e.g., ensures that the same winding direction is used for each element 500).

Figure 13:
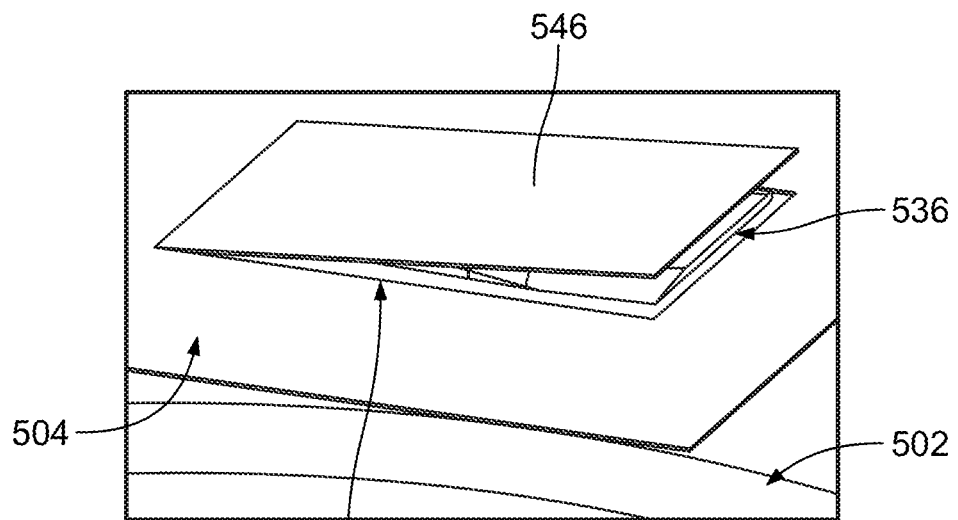
FIG. 13 is a perspective view of the axial flow element of FIG. 10 near a catch member.

FIG. 13 is a perspective view of the element 500 that shows an area near the catch 536 at the beginning of a winding operation. As shown in FIGS. 10 and 13, the flat layer 504 includes a plurality of generally rectangular-shaped perforations 544 in the flat layer 504. The perforations 544 may be die cut or otherwise formed into the flat layer 504 in a separate processing operation or at the beginning of the winding operation (e.g., by a laser, etc.). In the embodiment of FIG. 13, a flap 546 of excess material is included at each perforation 544. As shown in FIG. 13, the catches 536 are received within the perforations 544, and press upward against the flaps 546. Among other benefits, the flaps 546 may provide a visual aid to assist an operator in identifying an engagement condition between the catches 536 and the perforations 544. As the winding operation continues, each of the catches 536 are pushed against an edge of a corresponding one of the perforations 544, thereby preventing separation of the flat layer 504 from the hub 502.

Figure 14:
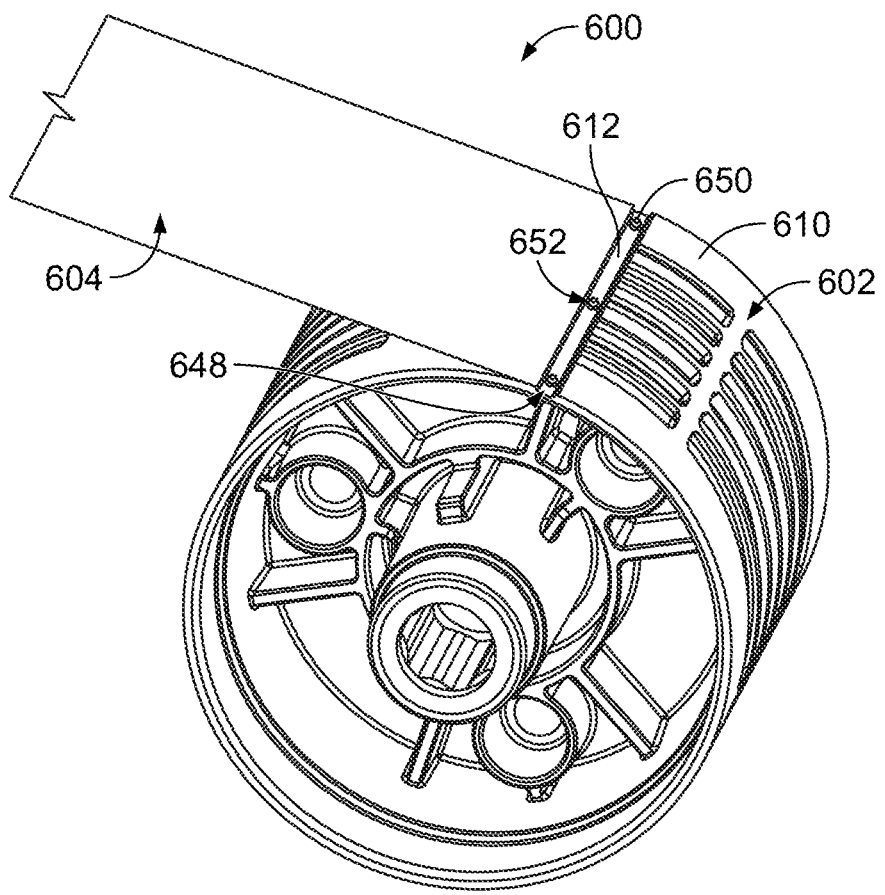
FIG. 14 is a perspective view of a fourth example axial flow element.
Figure 15:
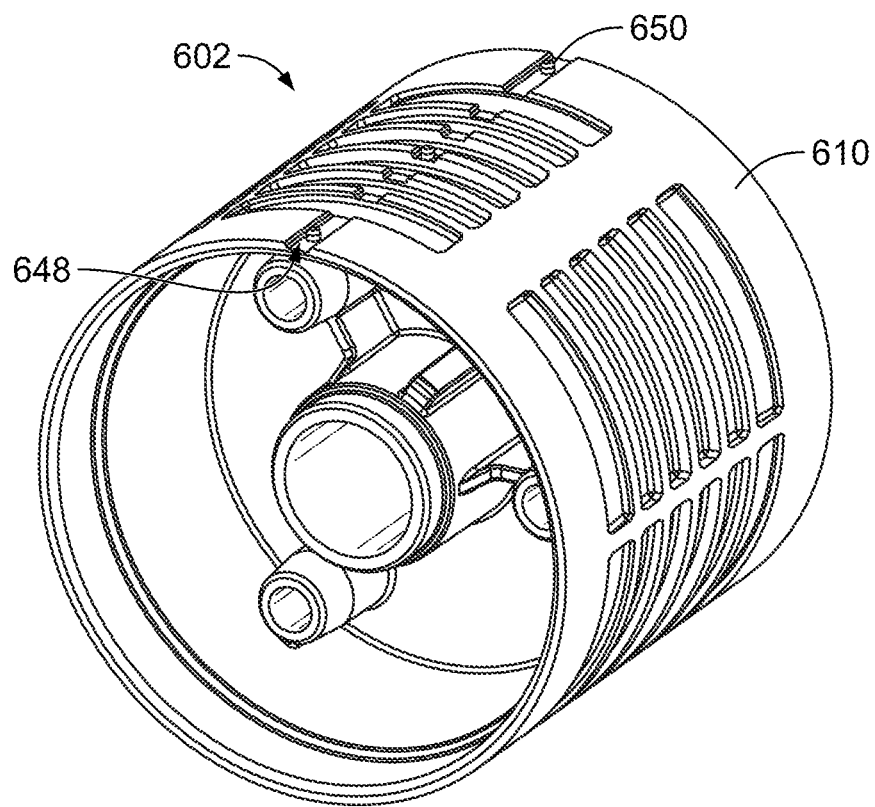
FIG. 15 is a perspective view of a hub of the axial flow element of FIG. 14.

FIG. 14 is a perspective view of a fourth example axial flow element, shown as element 600. The element 600 includes a hub 602 and a flat layer 604 that is attached to the hub 602 using a heat staking operation. As shown in FIG. 15, the hub 602 includes a recessed area 648 including a plurality of extension pieces 650 in the form of cylindrical posts spaced approximately evenly along an outer surface 610 of the hub 602. In other embodiment, the hub 602 does not include a recessed area 648 (e.g., the flat layer 604 may be affixed directly to an outer surface of the hub 602, etc.). The extension pieces 650 are alignable with a plurality of openings 652 that are cut or otherwise formed into the flat layer 604, proximate to a leading edge 612 of the flat layer 604. The openings 652 are sized and shaped to receive the extension pieces 650 therein. In some example embodiments, the openings 652 are laser cut (e.g., by a laser cutting tool) into the flat layer 604 at the beginning of the winding operation.

Figure 16:
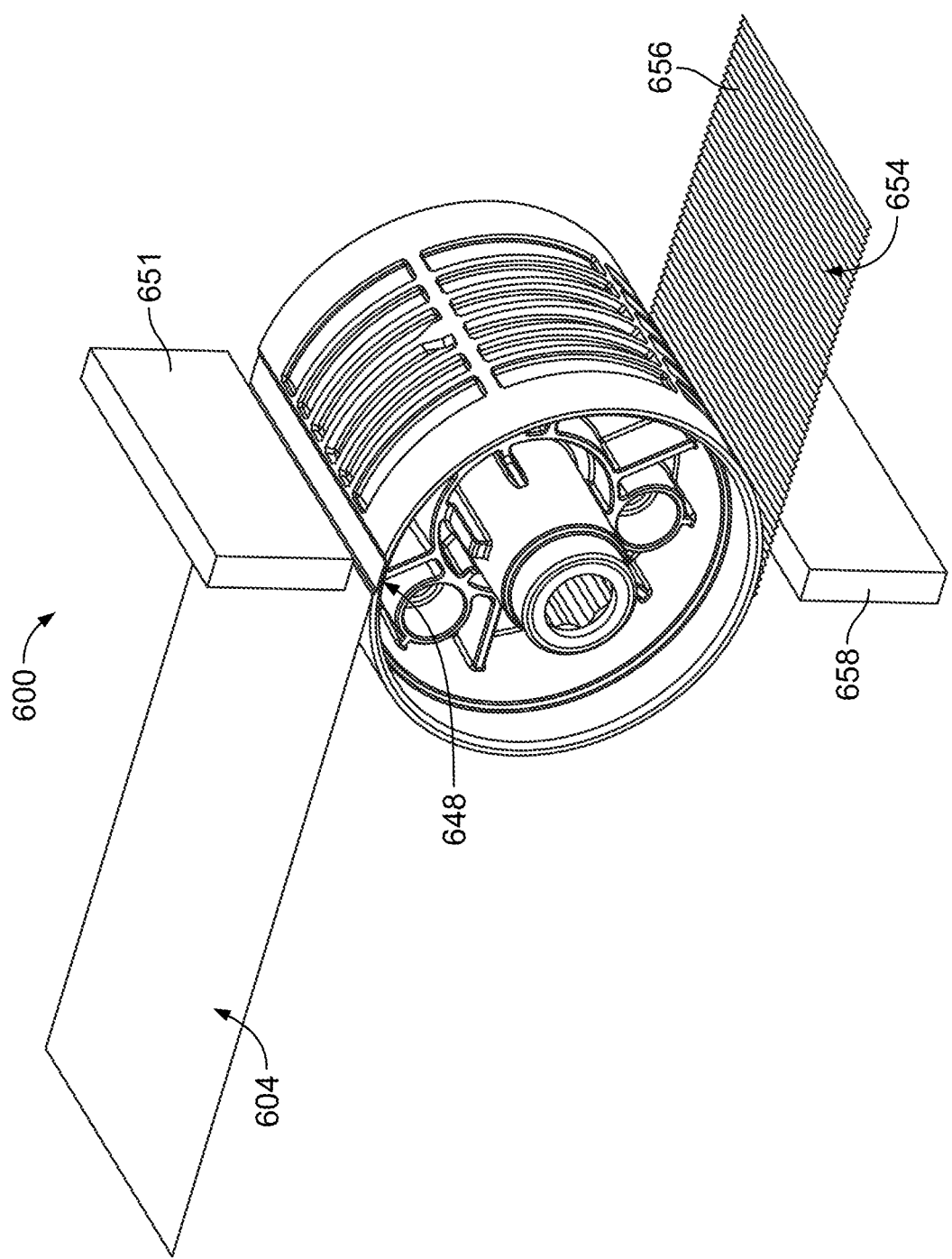
FIG. 16 is a perspective view of the axial flow element of FIG. 14 during a heat staking operation.
Figure 17:
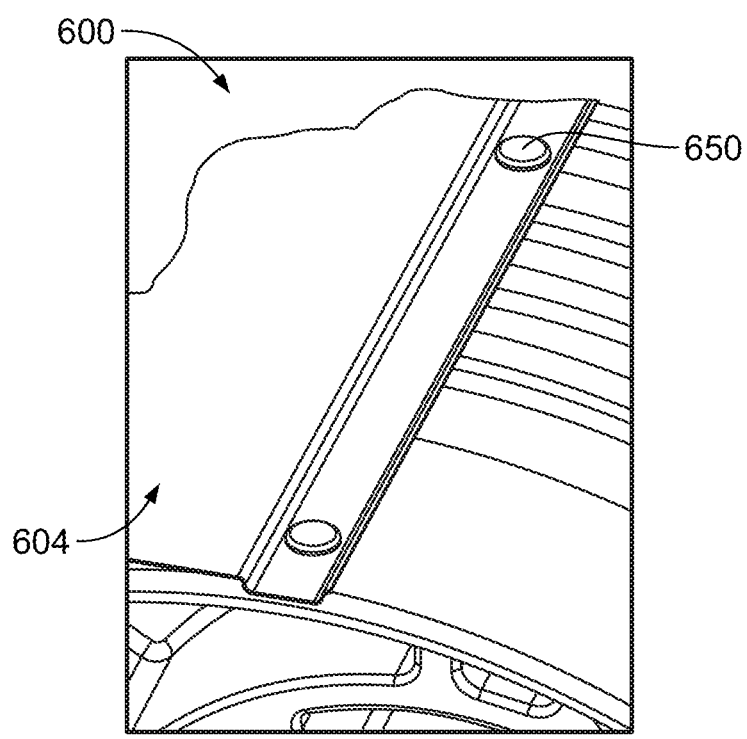
FIG. 17 is a perspective view of the axial flow element of FIG. 14 near a groove.

FIGS. 16 and 17 depict the element 600 during the heat staking operation and after the heat staking operation, respectively. As shown in FIG. 16, once the flat layer 604 is positioned within the recessed area 648 (and/or an area along the outer surface of the hub 602 at which the extension pieces 650 are located), a first press tool at elevated temperature is brought into contact with the extension pieces 650 (see also FIG. 16). The first press tool 651 melts or otherwise deforms the extension pieces 650 onto the flat layer 604, thereby securing the flat layer 604 in position with respect the hub 602. In other embodiments, the flat layer 604 is staked directly to the surface of the hub 602, without the extension pieces 650.

In some embodiments, the element 600 also includes other layers in addition to the flat layer 604 that are spirally wound onto the hub 602. As shown in FIG. 16, the element 600 includes a second layer 654 that is affixed to an outer surface of the hub 602, at a location that is opposite to where the hub 602 is connected to flat layer 604 (e.g., spaced approximately 180° from a position along the outer surface at which the flat layer 604 is staked to the hub 602). The second layer 654 may have different material properties from the flat layer 604. In other embodiments, the second layer 654 may have similar material properties as the flat layer 604. In one embodiment, the second layer 654 is a corrugated layer that includes corrugations 656 that are embossed or otherwise formed into the corrugated layer. As shown in FIG. 16, the second layer 654 is attached to the hub 602 at the same time as the flat layer 604. The heat staking operation used to connect the second layer 654 to the hub 602 may be the same as or similar to the heat staking operation used to connect the flat layer 604 to the hub 602. As shown in FIG. 16, the second layer 654 is positioned between the outer surface of the hub 602 and a second press tool 658, which stakes the second layer 654 onto the hub 602 and/or deforms a second plurality of extension pieces (not shown) over the second layer 654.

Figure 18:
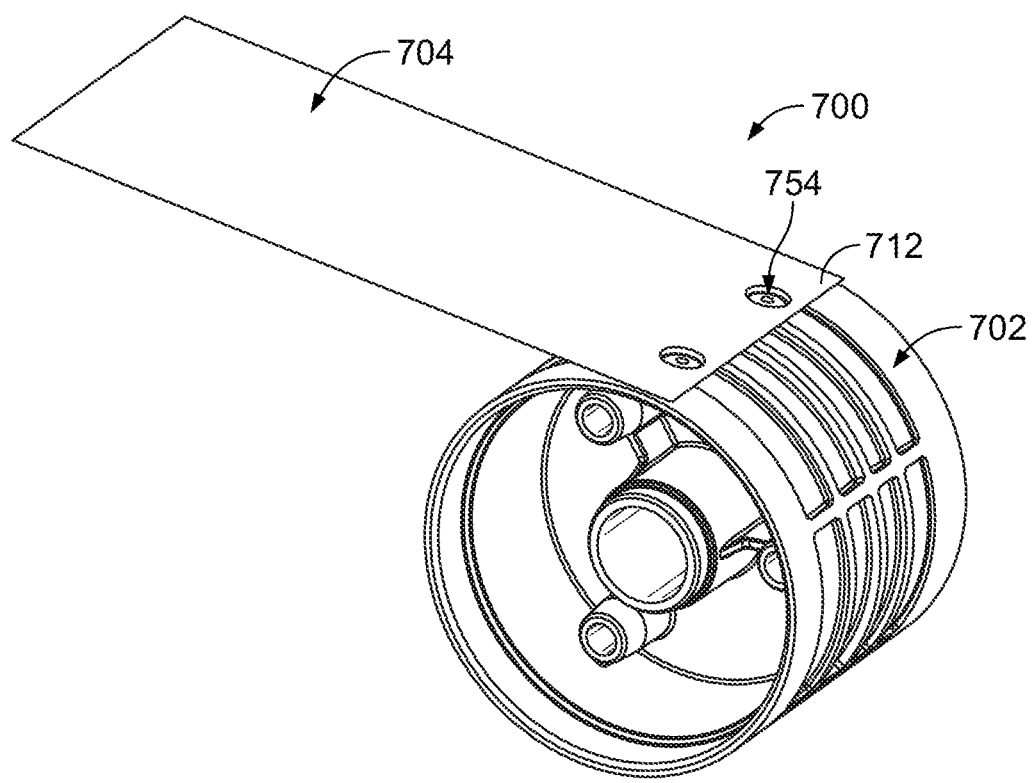
FIG. 18 is a perspective view of a fifth example axial flow element.
Figure 19:
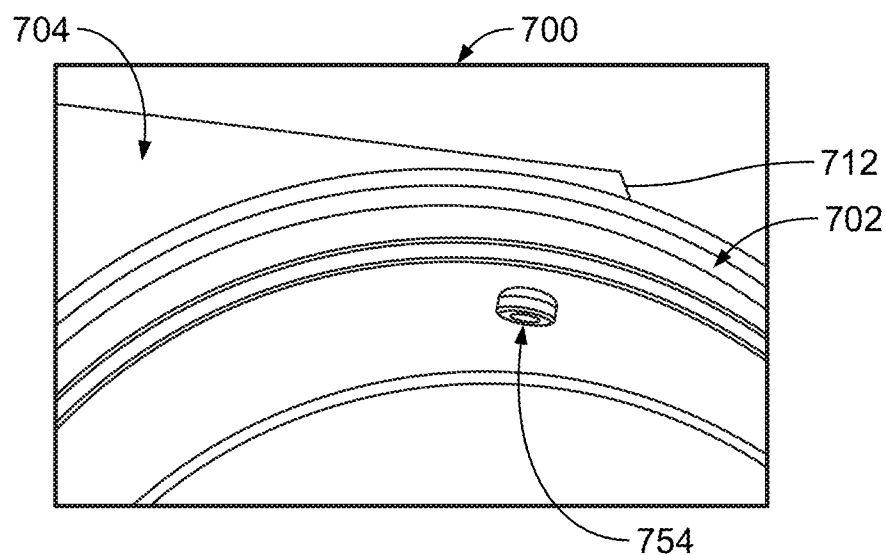
FIG. 19 is a perspective view of an inner surface of the axial flow element of FIG. 18.
Figure 20:
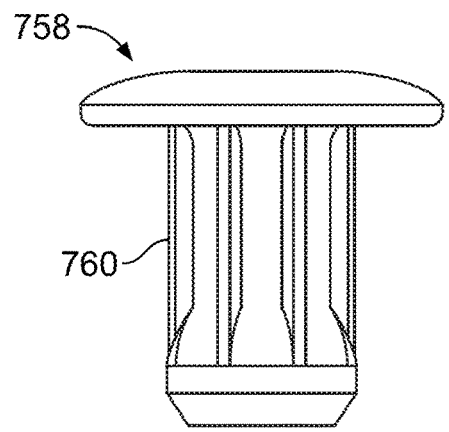
FIG. 20 is a side view of an example speed rivet.
Figure 21:
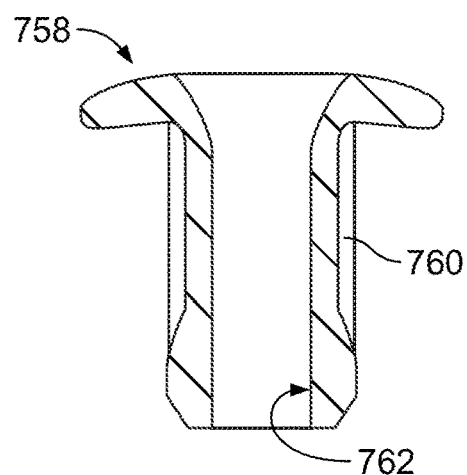
FIG. 21 is a side cross-sectional view of the speed rivet of FIG. 20.
Figure 22:
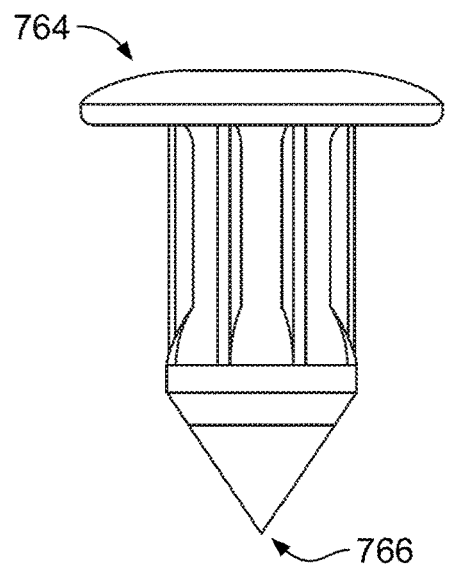
FIG. 22 is a side view of another example speed rivet.

FIGS. 18 and 19 depict a fifth example axial flow element, shown as element 700, in which a flat layer 704 is attached to a hub 702 using a plurality of fasteners 754. The fasteners 754 may include bolts, screws, or anther suitable fastener. In the example embodiment of FIGS. 18 and 19, the fasteners 754 are rivets that extend through the flat layer 704 and an outer wall 756 of the hub 702. In some example embodiments, the rivets are speed fastening rivets that are installed using a reusable mandrel (e.g., Neospeed® Speed Fastening® Rivets, etc.). An example speed rivet 758 is shown in FIGS. 20 and 21. The speed rivet 758 includes a plurality of ribs 760 extending radially outward from an outer surface of the speed rivet 758 in substantially parallel orientation with respect to a central axis of the speed rivet 758. During installation, a reusable mandrel presses radially outward against an inner surface 762 of the speed rivet 758 to deform the ribs 760 and thereby secure the speed rivet 758 to the hub 702 and the flat layer 704 (as shown in FIGS. 18-19). Among other benefits, using a speed rivet 758 to secure the flat layer 704 to the hub 702 eliminates metal debris and/or the risk of any metal pieces coming loose during installation. FIG. 22 shows another example speed rivet 764. A leading end 766 of the speed rivet 764 is tapered (e.g., pointed, etc.), which, advantageously, allows for installation of the speed rivet 764 into an unperforated flat layer. During installation, the leading end 766 punches a hole through the flat layer on an incoming stroke and secures the speed rivet 764 in position on an outgoing stroke. In other example embodiments, the shape of the leading end of the speed rivet may be different. For example, the leading end may include a tapered/sharp edge that extends along a perimeter of an internal opening of the speed rivet. The tapered/sharp edge punches through the flat layer, leaving behind a small piece of material from the flat layer, which may be discarded after joining the flat layer to the hub.

Figure 23:
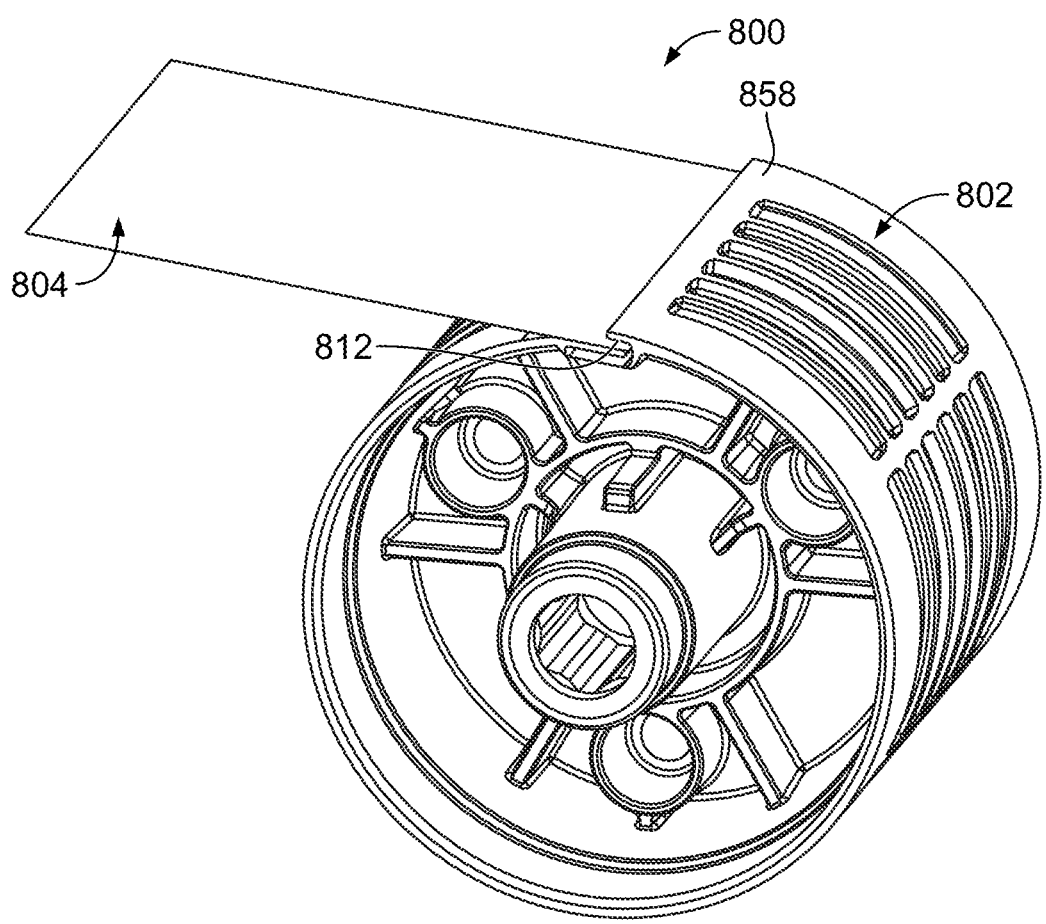
FIG. 23 is a perspective view of a sixth example axial flow element.
Figure 24:
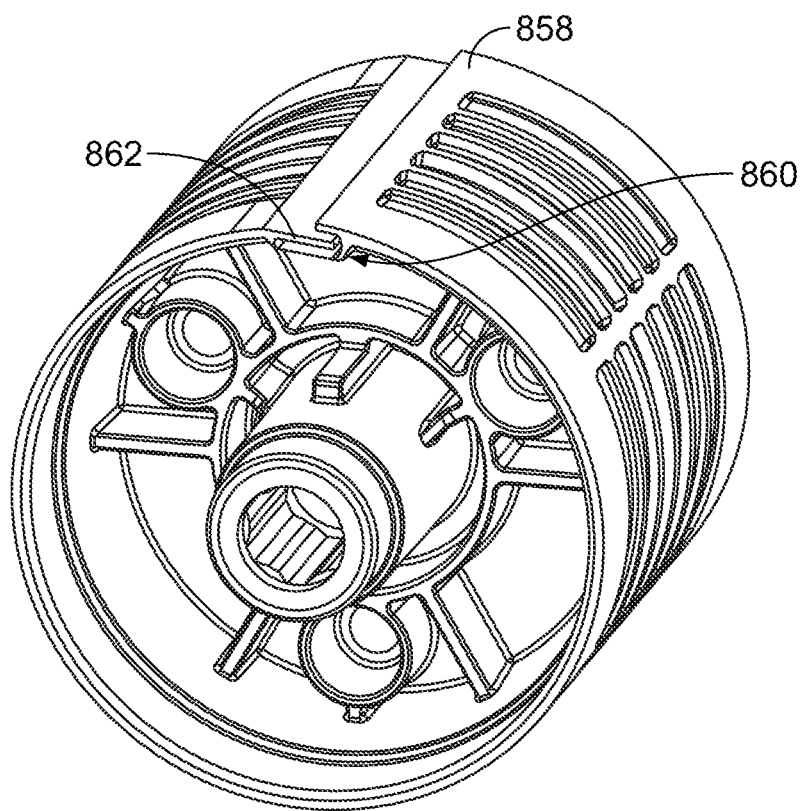
FIG. 24 is a perspective view of another example hub for an axial flow element.
Figure 25:
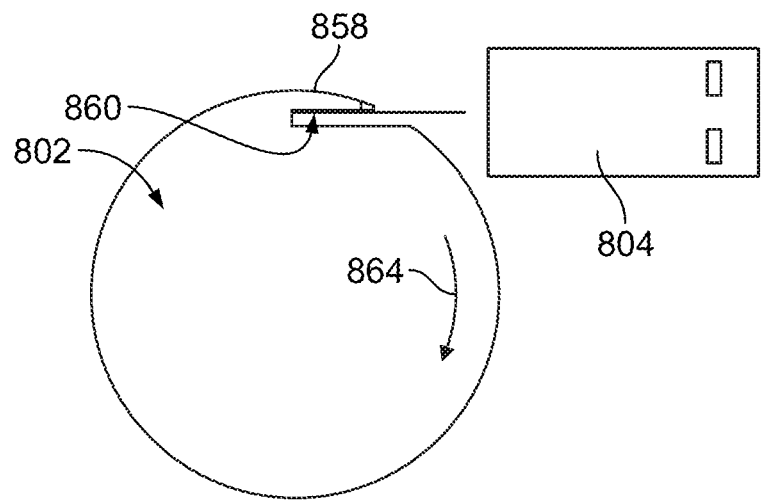
FIG. 25 is a top view of the axial flow element of FIG. 23 at the beginning of a winding operation.

FIG. 23 depicts a sixth example axial flow element, shown as element 800, in which a catch-and-fold technique is used to attach a leading edge 812 of a flat layer 804 to a hub 802. As shown in FIG. 24, the hub 802 includes a lip 858 defining a slot. The slot is configured to receive the leading edge 812 of the flat layer 804 therein. In the example embodiment of FIG. 24, the lip 858 is an upper one of a plurality of lips that further includes a lower lip 862. Together, the upper lip 858 and the lower lip 862 define a generally U-shaped slot 860. The slot 860 may be sized and shaped to receive a folded portion of the flat layer 804 therein. Alternatively, as shown in FIG. 25, the flat layer 804 may be received in only an upper portion of the slot 860. In FIG. 25, the winding operation begins by positioning the leading edge 812 of the flat layer 804 into the slot 860. This operation may be performed by rotating the hub 802 in a clockwise direction as indicated by arrow 864. Once the leading edge 812 is positioned within the slot 860, further rotation folds the flat layer 804 over the upper lip 858. The frictional force between the flat layer 804 and the upper lip 858 prevents the flat layer 804 from detaching or otherwise separating from the hub 802.

Figure 26:
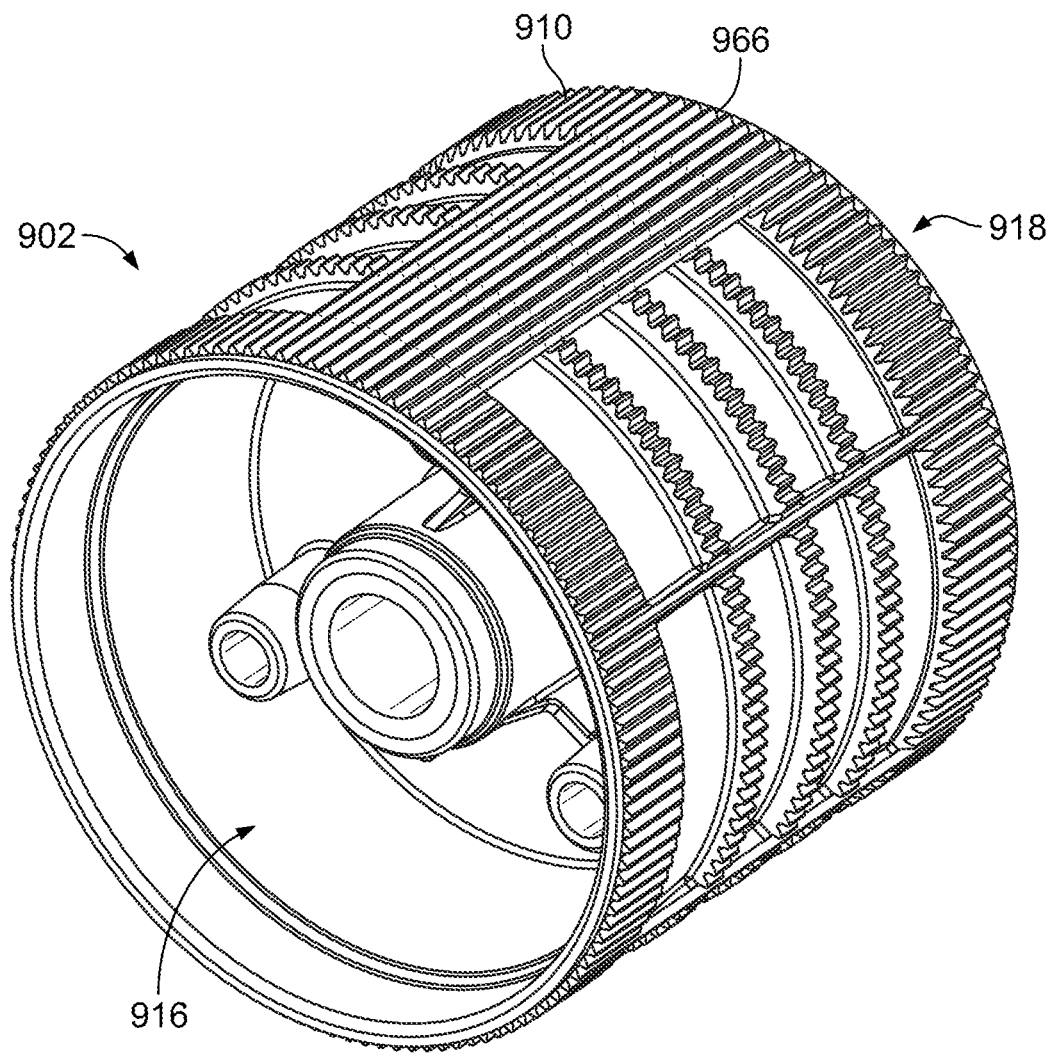
FIG. 26 is a perspective view of another example hub for an axial flow element.
Figure 27:
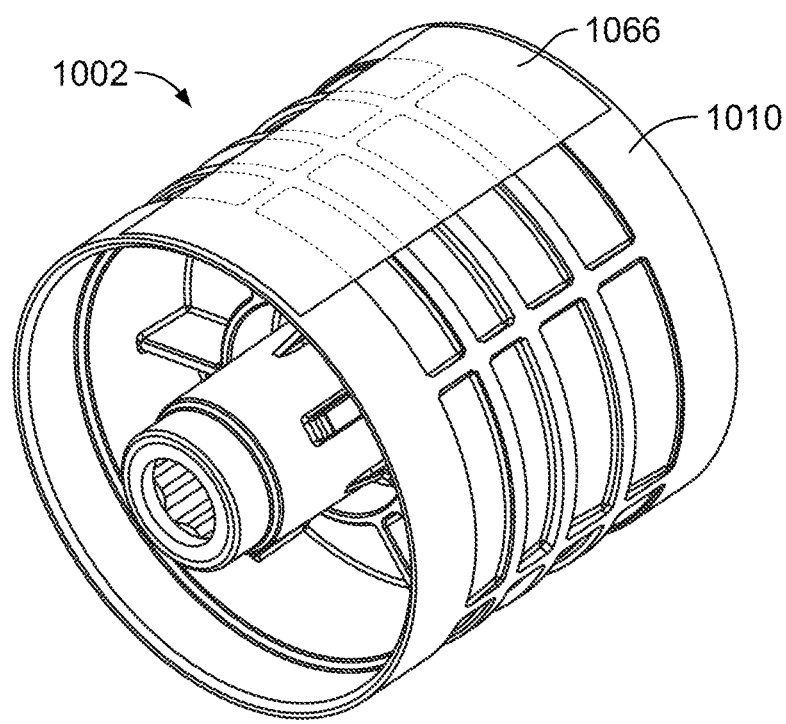
FIG. 27 is a perspective view of yet another example hub for an axial flow element.
Figure 28:
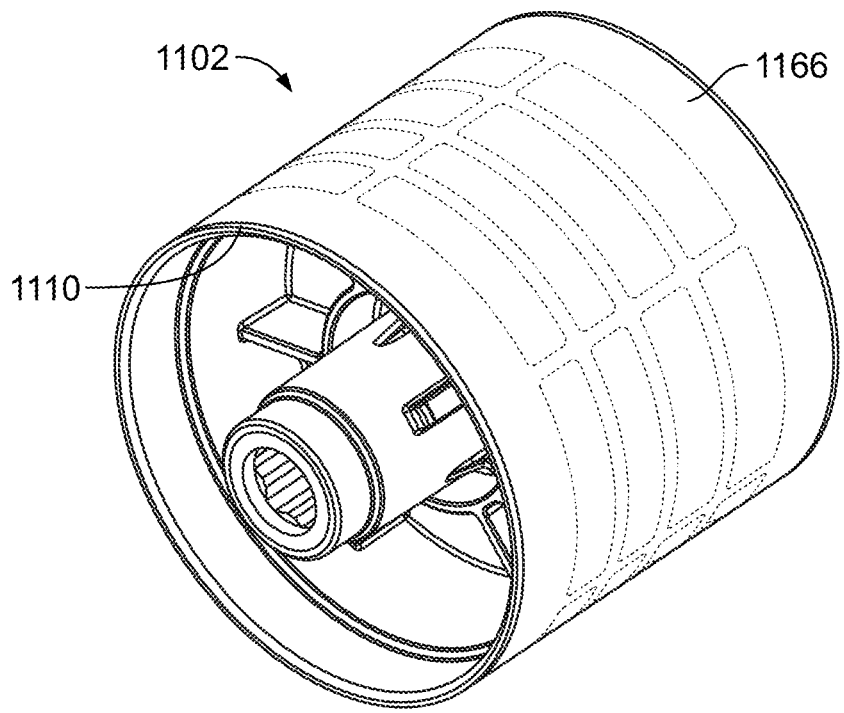
FIG. 28 is a perspective view of still another example hub for an axial flow element.

FIG. 26 is a perspective view of another hub 902 for an axial flow element in which a welding tape 966 is used to secure a flat layer to the hub 902. As shown, the welding tape 966 is applied over a small angular portion of the hub 802 in a longitudinal direction from a first end 916 of the hub 902 to a second end 918 of the hub 902. In other embodiments, the welding tape 966 may cover a greater portion of an outer surface 910 of the hub 902. For example, FIGS. 27 and 28 are perspective views of example hubs, shown as a first hub 1002 and a second hub 1102, including welding tapes (e.g., first welding tape 1066 and second welding tape 1166) that cover different portions the outer surfaces (e.g., first outer surface 1010 and second outer surface 1110, respectively) of the first hub 1002 and the second hub 1102. The welding tape may be a stainless steel or aluminum tape that is bonded to the hubs using adhesive product or another suitable bonding agent.

IV. Construction of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "approximately," "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "attached," and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language a "portion" is used, the item can include a portion and/or the entire item unless specifically stated to the contrary.

What is claimed is:

1. An axial flow element, comprising:
a hub having a cylindrical outer surface;
a groove disposed in the cylindrical outer surface, the groove extending in a substantially longitudinal direction along the hub from a first end of the hub to a second end of the hub;
a plurality of crush ribs disposed within the groove on both sides of the groove, the plurality of crush ribs spaced apart from one another in the longitudinal direction;
a locking member disposed in the groove; and
a flat layer disposed between the hub and the locking member.

2. The axial flow element of claim 1, wherein the groove includes a lower wall and two side walls extending radially outwardly from the lower wall in a substantially perpendicular orientation relative to the lower wall.

3. The axial flow element of claim 1, wherein the plurality of crush ribs is engaged with the locking member.

4. The axial flow element of claim 3, wherein the plurality of crush ribs are arranged in diametrically opposed pairs that are spaced at approximately equal intervals along a length of the groove.

5. The axial flow element of claim 3, wherein each one of the plurality of crush ribs includes a beveled portion proximate to an outer edge of the groove.

6. The axial flow element of claim 1, wherein a width of the groove is less than a diameter of the locking member.

7. The axial flow element of claim 1, wherein a depth of the groove in a radial direction is greater than a diameter of the locking member.

8. The axial flow element of claim 1, wherein the groove is one of a plurality of grooves spaced at approximately equal intervals along the cylindrical outer surface, and wherein the locking member is one of a plurality of locking members that are each disposed in a respective one of the plurality of grooves.

9. The axial flow element of claim 1, wherein the hub further comprises a balancing member disposed on an opposite side of the cylindrical outer surface as the groove.

10. The axial flow element of claim 1, wherein the locking member is a pin made from a magnetic material.

11. The axial flow element of claim 1, wherein a length of the locking member is approximately equal to a length of the hub in a longitudinal direction.

12. A method, comprising:
providing a hub, the hub comprising:
a groove disposed on a cylindrical outer surface of the hub, the groove extending in a substantially longitudinal direction along the hub from a first end of the hub to a second end of the hub; and
a plurality of crush ribs disposed within the groove and spaced apart from one another in the longitudinal direction along the length of the groove;
providing a flat layer;
providing a locking member;
positioning the flat layer above the groove;
positioning the locking member above the groove and the flat layer; and
engaging the locking member with the plurality of crush ribs that are disposed within the groove on both sides of the groove by pressing the locking member into the groove.

13. The method of claim 12, wherein the locking member comprises a pin made from a magnetic material, and wherein positioning the locking member above the groove and the flat layer comprises:
providing a press tool, the press tool comprising a magnetic holder;
engaging the magnetic holder with the pin; and
positioning the magnetic holder above the groove and the flat layer.

14. The method of claim 12, wherein pressing the locking member into the groove comprises deforming a plurality of crush ribs disposed within the groove.

15. The method of claim 12, wherein positioning the flat layer above the groove comprises advancing the flat layer until a leading edge of the flat layer extends beyond a trailing edge of the groove.

* * * * *